(12) United States Patent
Su

(10) Patent No.: US 10,816,025 B1
(45) Date of Patent: Oct. 27, 2020

(54) SCREW BAND

(71) Applicant: GUANGZHE ENTERPRISE CO., LTD., Kaohsiung (TW)

(72) Inventor: Fu Cheng Su, Kaohsiung (TW)

(73) Assignee: GUANGZHE ENTERPRISE CO., LTD., Kaohsiung (TW)

( * ) Notice: Subject to any disclaimer, the term of this patent is extended or adjusted under 35 U.S.C. 154(b) by 0 days.

(21) Appl. No.: 16/549,647

(22) Filed: Aug. 23, 2019

(51) Int. Cl.
*F16B 27/00* (2006.01)
*B25H 3/06* (2006.01)
*B25B 23/02* (2006.01)

(52) U.S. Cl.
CPC .............. *F16B 27/00* (2013.01); *B25B 23/02* (2013.01); *B25H 3/06* (2013.01)

(58) Field of Classification Search
CPC ............ B25B 23/02; B25H 3/06; F16B 27/00
See application file for complete search history.

(56) References Cited

U.S. PATENT DOCUMENTS

| | | | | |
|---|---|---|---|---|
| 3,446,261 A | * | 5/1969 | Dey | F16B 27/00 411/85 |
| 3,471,008 A | * | 10/1969 | Cast | F16B 15/08 206/344 |
| 3,611,864 A | * | 10/1971 | Buckley | F16B 5/02 411/85 |
| 3,625,352 A | * | 12/1971 | Perkins | F16B 15/08 206/344 |
| 3,747,657 A | * | 7/1973 | Ryder | F16B 11/006 411/82 |
| 3,944,068 A | * | 3/1976 | Maier | B25C 1/184 206/347 |
| 3,967,727 A | * | 7/1976 | Jakesch | F16B 27/00 206/344 |
| 3,974,913 A | * | 8/1976 | Hirsch | B21J 15/105 206/344 |
| 4,018,334 A | * | 4/1977 | Lejdegard | F16B 27/00 206/346 |
| 4,019,631 A | * | 4/1977 | Lejdegard | B65D 73/0042 206/347 |

(Continued)

FOREIGN PATENT DOCUMENTS

| | | | | |
|---|---|---|---|---|
| CA | 2273711 A1 | * | 12/2000 | ............. F16B 37/048 |
| DE | 2411184 A1 | * | 9/1974 | .............. F16B 27/00 |

(Continued)

*Primary Examiner* — Stanton L Krycinski
(74) *Attorney, Agent, or Firm* — Rabin & Berdo, P.C.

(57) ABSTRACT

A screw band has a body and multiple positioning members disposed on the body. The body has two paper layers and an adhesive layer. Each one of the two paper layers has a paper base and a waterproof heat-insulation film. The waterproof heat-insulation film is mounted on an outer surface of the paper base. The adhesive layer is disposed between and is connected with the two paper layers. The adhesive layer is connected to inner surfaces of the paper bases of the two paper layers. The waterproof heat-insulation films of the two paper layers are respectively located at two outer surfaces of the body. With the waterproof heat-insulation films, the screw band has waterproof and heat-insulation effects. Screws or screw assemblies are easy to be applied with coating and baking processes automatically with the screw band.

12 Claims, 13 Drawing Sheets

(56) References Cited

U.S. PATENT DOCUMENTS

| | | | | |
|---|---|---|---|---|
| 4,167,229 A * | 9/1979 | Keusch | F16B 27/00 | 206/343 |
| 4,279,341 A * | 7/1981 | Pleickhardt | B65D 73/02 | 206/345 |
| 4,822,224 A * | 4/1989 | Carl | F16B 11/006 | 248/205.3 |
| 4,955,476 A * | 9/1990 | Nakata | F16B 27/00 | 206/343 |
| 5,005,699 A * | 4/1991 | Kawashima | F16B 27/00 | 206/344 |
| 5,051,049 A * | 9/1991 | Wills | F16B 27/00 | 411/165 |
| 5,344,012 A * | 9/1994 | Matthews | B25H 3/06 | 206/372 |
| 5,373,939 A * | 12/1994 | Bloomgren | A47F 7/0028 | 206/341 |
| 5,409,111 A * | 4/1995 | Takumi | F16B 27/00 | 206/344 |
| 5,509,768 A * | 4/1996 | Hon | F16B 27/00 | 411/442 |
| 5,522,687 A * | 6/1996 | Chen | F16B 27/00 | 206/347 |
| 5,544,746 A * | 8/1996 | Dohi | B25B 23/045 | 206/346 |
| 5,560,480 A * | 10/1996 | Singleton | B25H 3/06 | 206/373 |
| 5,660,276 A * | 8/1997 | Winnard | B25H 3/06 | 206/350 |
| 5,713,709 A * | 2/1998 | Huang | F16B 27/00 | 411/442 |
| 5,775,514 A * | 7/1998 | Lin | F16B 27/00 | 206/343 |
| 5,779,420 A * | 7/1998 | Huang | F16B 27/00 | 206/347 |
| 5,788,445 A * | 8/1998 | Huang | F16B 15/08 | 411/442 |
| 5,803,691 A * | 9/1998 | Huang | F16B 27/00 | 206/347 |
| 5,839,332 A * | 11/1998 | Fujiyama | B25B 23/045 | 81/434 |
| 5,913,421 A * | 6/1999 | Shinjo | F16B 27/00 | 206/341 |
| 5,931,298 A * | 8/1999 | Huang | F16B 27/00 | 206/346 |
| 5,984,096 A * | 11/1999 | Shinjo | F16B 27/00 | 206/346 |
| 6,036,013 A * | 3/2000 | Chen | F16B 27/00 | 206/347 |
| 6,620,011 B2 * | 9/2003 | Obermeier | F16B 27/00 | 411/442 |
| 6,722,497 B2 * | 4/2004 | Pally | F16B 15/08 | 206/338 |
| 6,783,001 B2 * | 8/2004 | Wollner | B25B 23/045 | 206/338 |
| 6,811,366 B2 * | 11/2004 | Chen | F16B 43/00 | 206/346 |
| 6,832,696 B2 * | 12/2004 | Donner | F16B 27/00 | 206/345 |
| 6,974,030 B1 * | 12/2005 | Sundstrom | B25B 23/005 | 206/347 |
| 7,090,077 B2 * | 8/2006 | Pally | F16B 27/00 | 206/347 |
| 7,594,456 B2 * | 9/2009 | Hauber | B65D 73/02 | 81/434 |
| 7,748,544 B1 * | 7/2010 | Davitz | A47B 96/06 | 211/70.6 |
| 10,023,373 B2 * | 7/2018 | Shadwell | B25C 7/00 | |
| 10,428,853 B2 * | 10/2019 | Nakagawa | F16B 27/00 | |
| 2003/0035702 A1 * | 2/2003 | Lin | F16B 27/00 | 411/442 |
| 2003/0102236 A1 * | 6/2003 | Wei | B65D 73/02 | 206/347 |
| 2003/0127346 A1 * | 7/2003 | Chen | B65D 85/24 | 206/346 |
| 2004/0042875 A1 * | 3/2004 | Huang | F16B 27/00 | 411/442 |
| 2006/0006087 A1 * | 1/2006 | Lin | F16B 27/00 | 206/347 |
| 2006/0006088 A1 * | 1/2006 | Lin | F16B 15/08 | 206/347 |
| 2007/0224396 A1 * | 9/2007 | Huang | F16B 27/00 | 428/166 |
| 2007/0292239 A1 * | 12/2007 | Lin | F16B 27/00 | 411/442 |
| 2008/0000942 A1 * | 1/2008 | Sundstrom | B25B 23/06 | 227/120 |
| 2009/0110508 A1 * | 4/2009 | Lin | F16B 27/00 | 411/84 |
| 2010/0051490 A1 * | 3/2010 | Shinjo | F16B 41/002 | 206/347 |
| 2011/0300955 A1 * | 12/2011 | Dissing | B05C 13/025 | 470/9 |
| 2012/0074008 A1 * | 3/2012 | Lin | F16B 27/00 | 206/347 |
| 2012/0292212 A1 * | 11/2012 | Lin | F16B 27/00 | 206/347 |
| 2013/0001116 A1 * | 1/2013 | Lin | F16B 27/00 | 206/347 |
| 2013/0276675 A1 * | 10/2013 | Guerrero | B25H 3/06 | 108/27 |

FOREIGN PATENT DOCUMENTS

| | | | | |
|---|---|---|---|---|
| DE | 3831625 A1 * | 5/1989 | | F16B 27/00 |
| DE | 9305336 U1 * | 8/1994 | | F16B 27/00 |
| DE | 29500047 U1 * | 2/1995 | | F16B 27/00 |
| DE | 29503681 U1 * | 4/1995 | | F16B 27/00 |
| DE | 8817271 U1 * | 8/1996 | | F16B 27/00 |
| DE | 19716669 A1 * | 11/1998 | | F16B 27/00 |
| DE | 20002798 U1 * | 4/2000 | | F16B 27/00 |
| DE | 202015006736 U1 * | 5/2016 | | A47G 29/087 |
| EP | 1124064 A1 * | 8/2001 | | F16B 27/00 |
| EP | 1705388 A1 * | 9/2006 | | F16B 27/00 |
| EP | 1860333 A1 * | 11/2007 | | F16B 27/00 |
| EP | 1862679 A1 * | 12/2007 | | F16B 27/00 |
| EP | 2397706 A1 * | 12/2011 | | F16B 27/00 |
| GB | 1032171 A * | 6/1966 | | B25B 23/045 |
| GB | 1526507 A * | 9/1978 | | F16B 27/00 |
| JP | 04372373 A * | 12/1992 | | F16B 27/00 |
| JP | 08189520 A * | 7/1996 | | |
| JP | 10315153 A * | 12/1998 | | |
| WO | WO-2008104093 A1 * | 9/2008 | | F16B 27/00 |
| WO | WO-2010088907 A1 * | 8/2010 | | F16B 27/00 |

* cited by examiner

SCREW BAND

BACKGROUND OF THE INVENTION

1. Field of the Invention

The present invention relates to a screw band, and more particularly to a screw band that is applied to hold multiple screw assemblies and has waterproof and heat-insulation effects.

2. Description of Related Art

A screw is a fastener and is used to fix multiple objects. In use, a washer is disposed around the screw. The screw is screwed into the objects. The washer is clamped between a head of the screw and an adjacent object, is deformed, and abuts against the adjacent object for increasing the fixing effect and the waterproof effect.

For convenience in use, a conventional screw band is used to hold multiple screws. The screws are directly disposed on the conventional screw band to form a screw band assembly. Or the screws with washers are disposed on the conventional screw band to form the screw band assembly. The screw band assembly is easy to carry. The screws disposed on the conventional screw band can be easily detached from the conventional screw band.

The conventional screw band has a body. The body is made of plastic or rubber and has multiple through holes formed through the body. Multiple slashes are located around each one of the through holes. Multiple bendable supporting plates are disposed around each one of the through holes. The screws with the washers are respectively inserted into the through holes of the body. The supporting plates located around the corresponding one of the through holes co-clip the corresponding one of the washers for positioning the corresponding one of the washers. Each one of the screws with washers can be detached from the screw band.

For antirust or appearance purposes, some screws are processed with surface treatment to be coated with colors and baked and to enhance the antirust effect by the coating layer on the screw, or to enhance the visual appeal by using a colored coating layer on the screw. The screws must be coated and baked, and then the washers are respectively disposed around the screws. The screws with the washers are disposed on the screw band. In the coating and baking processes, scattered screws are difficult to be automatically applied with the coating and the baking processes.

Moreover, the body of the screw band made of plastic or rubber does not have the heat-insulation effect. After the screws are disposed on the screw band, the screw band with screws cannot be applied with the coating and the baking processes.

To overcome the shortcomings, the present invention provides a screw band to mitigate or obviate the aforementioned problems.

SUMMARY OF THE INVENTION

The objective of the invention is to provide a screw band that can solve the shortcoming that the conventional screw band with screws cannot be applied with coating and baking processes, and the screws are difficult to be automatically applied with coating and baking processes.

The screw band has a body and multiple positioning members. The body has two outer surfaces, two paper layers and at least one adhesive layer. The paper layers are disposed at a spaced interval. Each one of the two paper layers has a paper base and a waterproof heat-insulation film. The paper base has an outer surface and an inner surface. The waterproof heat-insulation film is formed on and covers the outer surface of the paper base. The at least one adhesive layer is disposed between and is connected with the two paper layers. The at least one adhesive layer is connected to the inner surface of the paper base of each one of the two paper layers. The waterproof heat-insulation films of the two paper layers are respectively located at the two outer surfaces of the body. The positioning members are disposed on the body at spaced intervals.

The screw band in accordance with the present invention has the following advantages.

1. Convenience in use: the screw band has the positioning members disposed on the body at spaced intervals. Each one of the positioning members can be used to clip a screw or the screw with a washer for using conveniently in the screwing operation.

2. Ease for application of coating and baking processes automatically: the two paper layers are fixedly stacked by the at least one adhesive layer. The waterproof heat-insulation films of the two paper layers are respectively located at the two outer surfaces of the body. The screw band has waterproof and heat-insulation effects due to the waterproof heat-insulation films. After the screws or the screws with washers are disposed on the screw band, the screws or the screws with washers are easy to be automatically applied to coating and baking processes with the screw band. Furthermore, the screw band can be adapted in water or a wet environment.

3. Environmental friendliness: the body has the two paper layers having the paper bases. A material of the paper base of each one of the two paper layers is paper. Therefore, the adoption of the paper bases is environmentally friendly.

Other objectives, advantages and novel features of the invention will become more apparent from the following detailed description when taken in conjunction with the accompanying drawings.

DETAILED DESCRIPTION OF THE PREFERRED EMBODIMENT

With reference to FIGS. 1, 2, 10, 11, and 13, a screw band 1A, 1B, 1C, 1D in accordance with the present invention comprises a body 10A, 10B, 10C, 10D and multiple positioning members 15A, 15B, 15C, 15D disposed on the body 10A, 10B, 10C, 10D at spaced intervals. The positioning members 15A, 15B, 15C, 15D are disposed along an axial direction of the body 10A, 10B, 10C, 10D.

In the embodiments of the screw band 1A, 1B, 1C, 1D, layered structures in the bodies 10A, 10B, 10C, 10D of the embodiments of the screw band 1A, 1B, 1C, 1D are the same.

Figure 3:
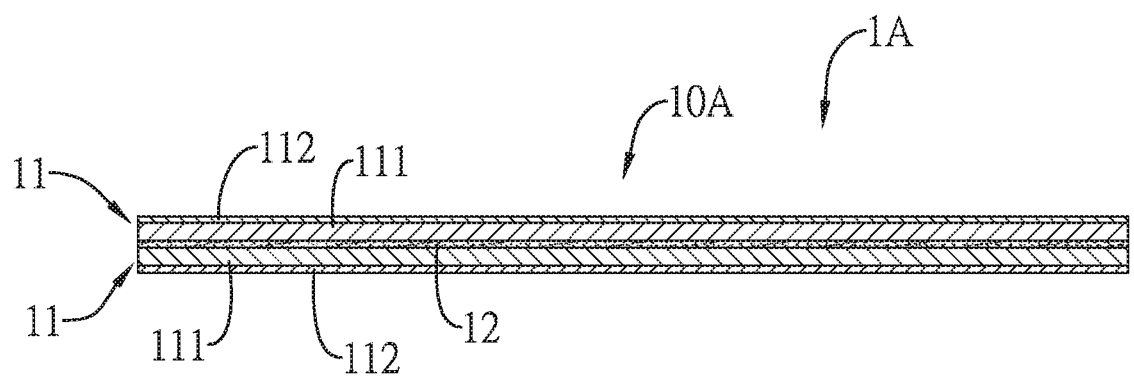
FIG. 3 is a cross sectional side view of the screw band along line 3-3 in FIG. 2.

With reference to FIG. 3, in a first embodiment of the screw band 1A, the body 10A has two outer surfaces, two paper layers 11 and at least one adhesive layer 12. The two paper layers 11 are disposed at a spaced interval. Each one of the two paper layers 11 has a paper base 111 and a waterproof heat-insulation film 112. The paper base 111 has an outer surface and an inner surface. The waterproof heat-insulation film 112 is mounted on and covers the outer surface of the paper base 111. The at least one adhesive layer 12 is disposed between and connected with the two paper layers 11. The at least one adhesive layer 12 is connected to the inner surfaces of the paper bases 111 of the two paper layers 11. The waterproof heat-insulation films 112 of the two paper layers 11 are respectively located at the two outer surfaces of the body 10A. The heat-resistant temperature of the waterproof heat-insulation film 112 is about 100° C. to 260° C., so that the screw band 1A has good waterproof and heat-insulation effects. Material selections of the paper base 111 and the waterproof heat-insulation film 112 are known technologies, and will not be further described.

A thickness of each one of the two paper layers 11 depends on the needs of the product. The thickness of each one of the two paper layers is 0.4 mm to 0.6 mm. Furthermore, the thickness of each one of the two paper layers is 0.5 mm. A strength of the body 10A of the screw band 1A is sufficient to hold multiple screws with washers.

The at least one adhesive layer 12 is selected from environmentally friendly adhesives. The inner surface of the paper base 111 is rough to increase adhesive strength between the inner surface of the paper base 111 and the at least one adhesive layer 12.

Figure 4:
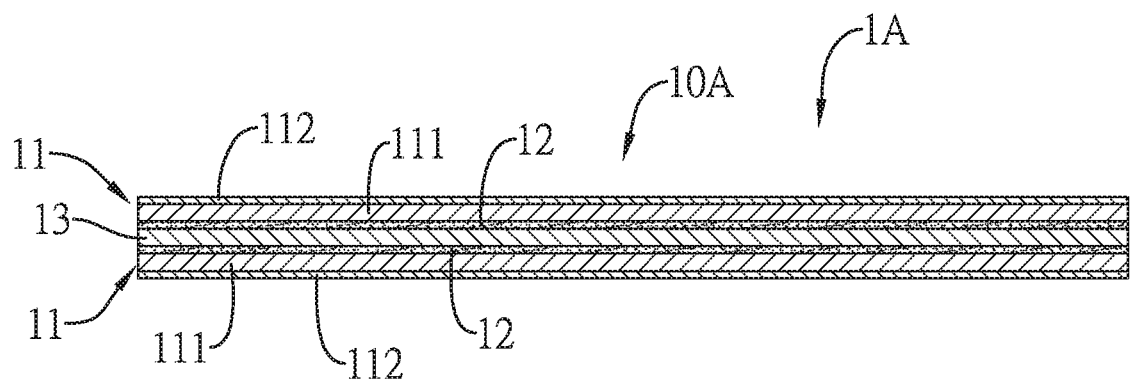
FIG. 4 is another cross sectional side view of the screw band showing that the screw band has a reinforcing layer.
Figure 5:
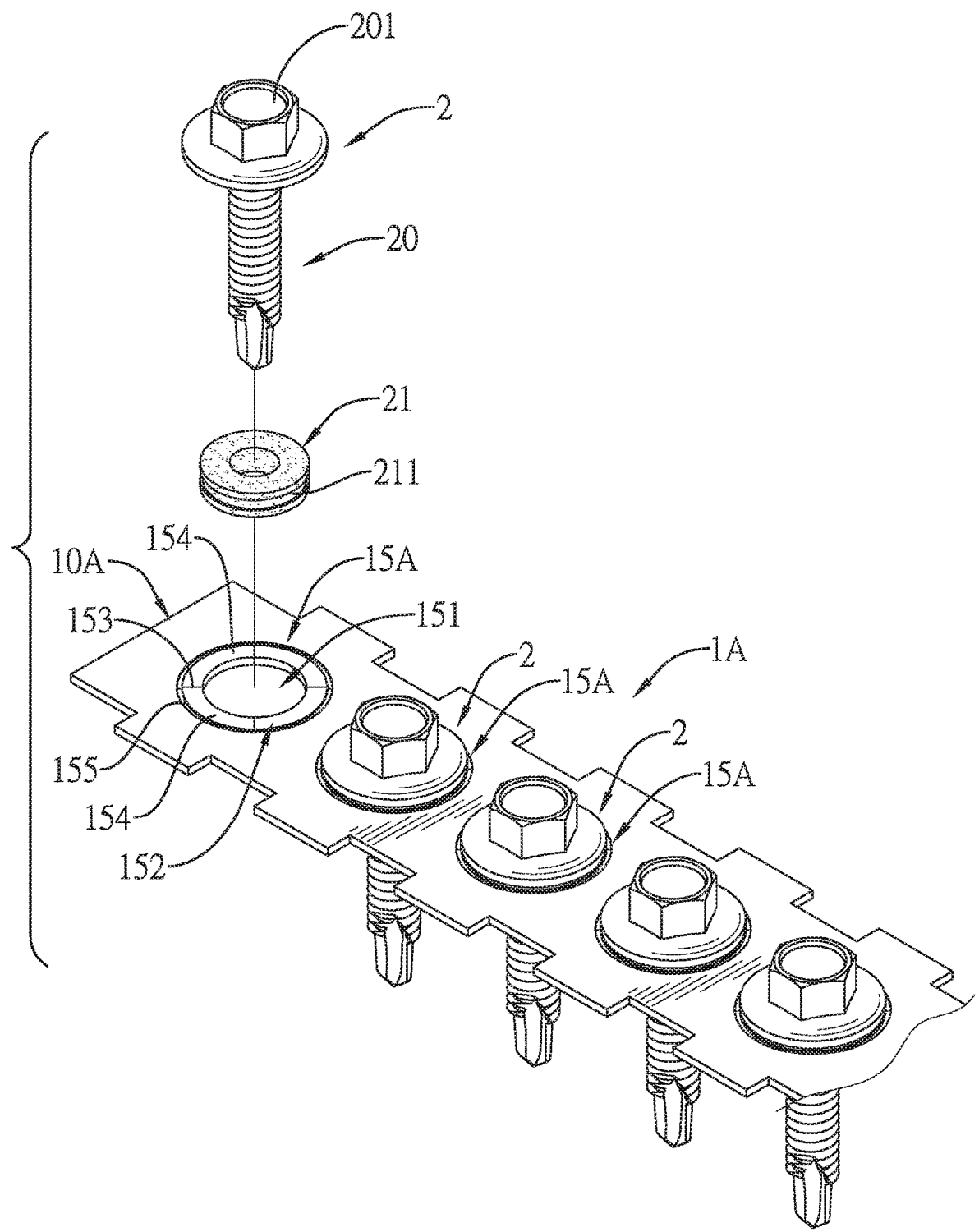
FIG. 5 is an operational exploded perspective view of the screw band in FIG. 1.
Figure 6:
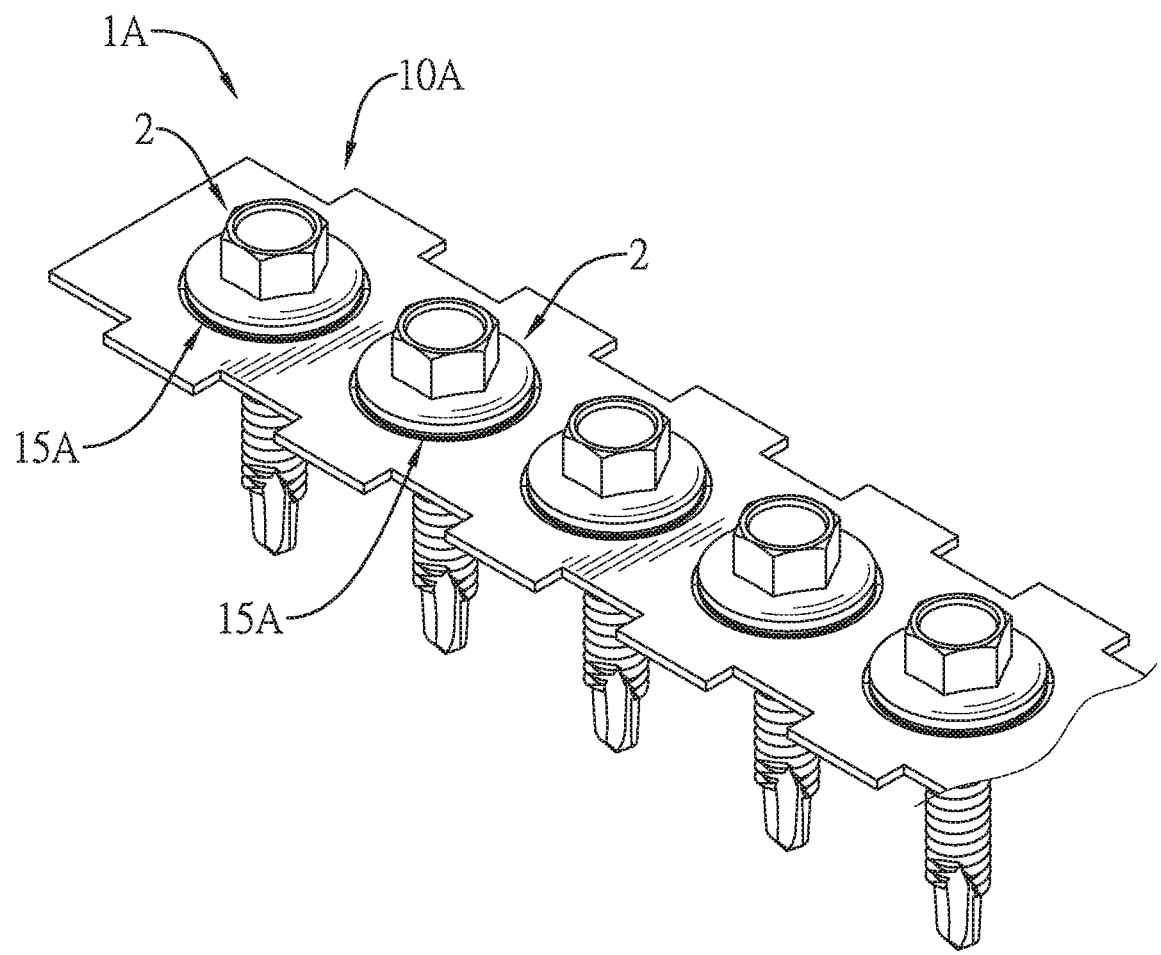
FIG. 6 is an operational perspective view of the screw band in FIG. 1.
Figure 7:
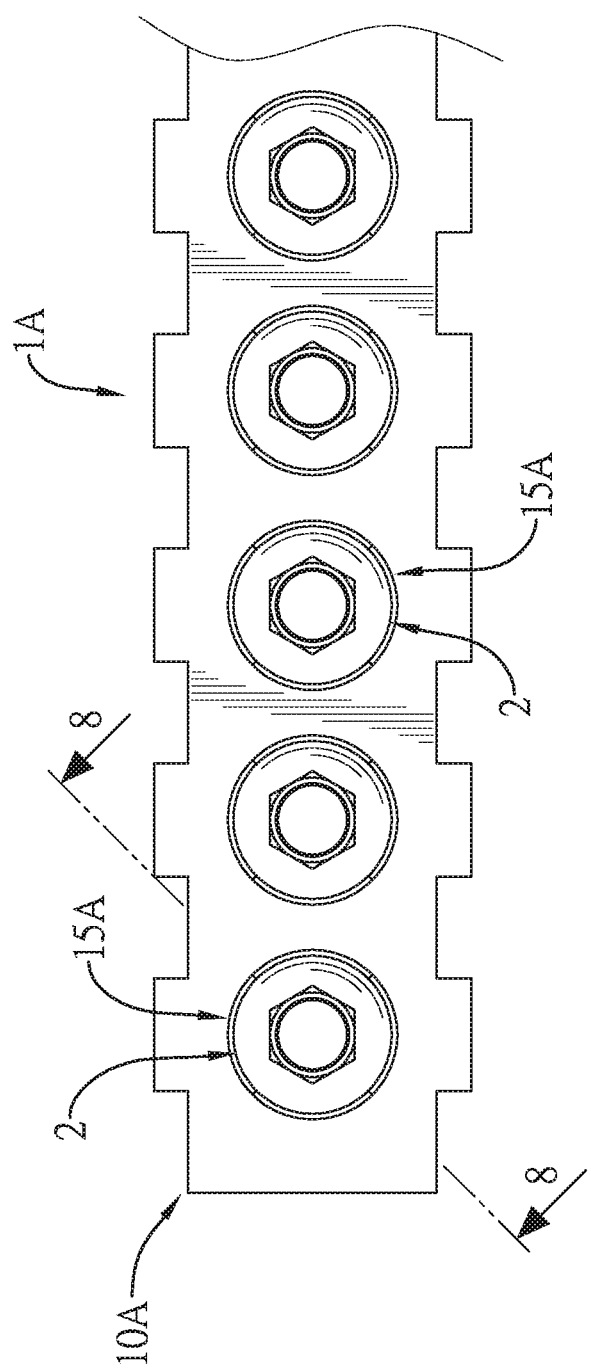
FIG. 7 is an operational top side view of the screw band in FIG. 6.

With reference to FIG. 4, the at least one adhesive layer 12 includes multiple adhesive layers 12, and the body 10A has at least one reinforcing layer 13. The at least one reinforcing layer 13 is adhesively disposed between the two paper layers 11, and is adhered to the two paper layers 11 by the multiple adhesive layers 12. When the body 10A has multiple reinforcing layers 13, the reinforcing layers 13 are stacked by an adhesion means. A material of each one of the at least one reinforcing layer 13 is paper and is same as a material of the paper base 111 of each one of the two paper layers 11. Furthermore, the material of the paper base 111 of each one of the two paper layers 11 is paper. The adoption of the paper bases 111 is environmentally friendly.

The structure of the body 10A, 10B, 10C, 10D and the structures of the positioning members 15A, 15B, 15C, 15D in the multiple embodiments of the screw band 1A, 1B, 1C, 1D are described as follows.

Figure 1:
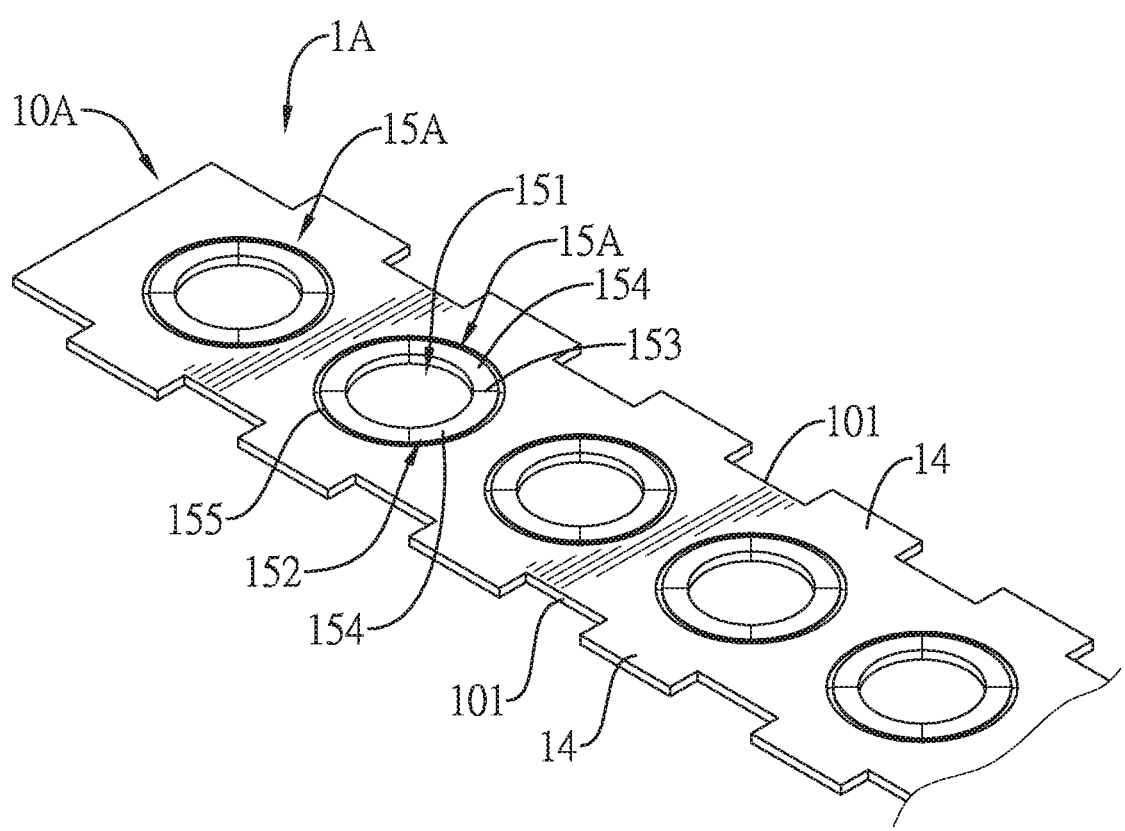
FIG. 1 is a perspective view of a first embodiment of a screw band in accordance with the present invention.
Figure 2:
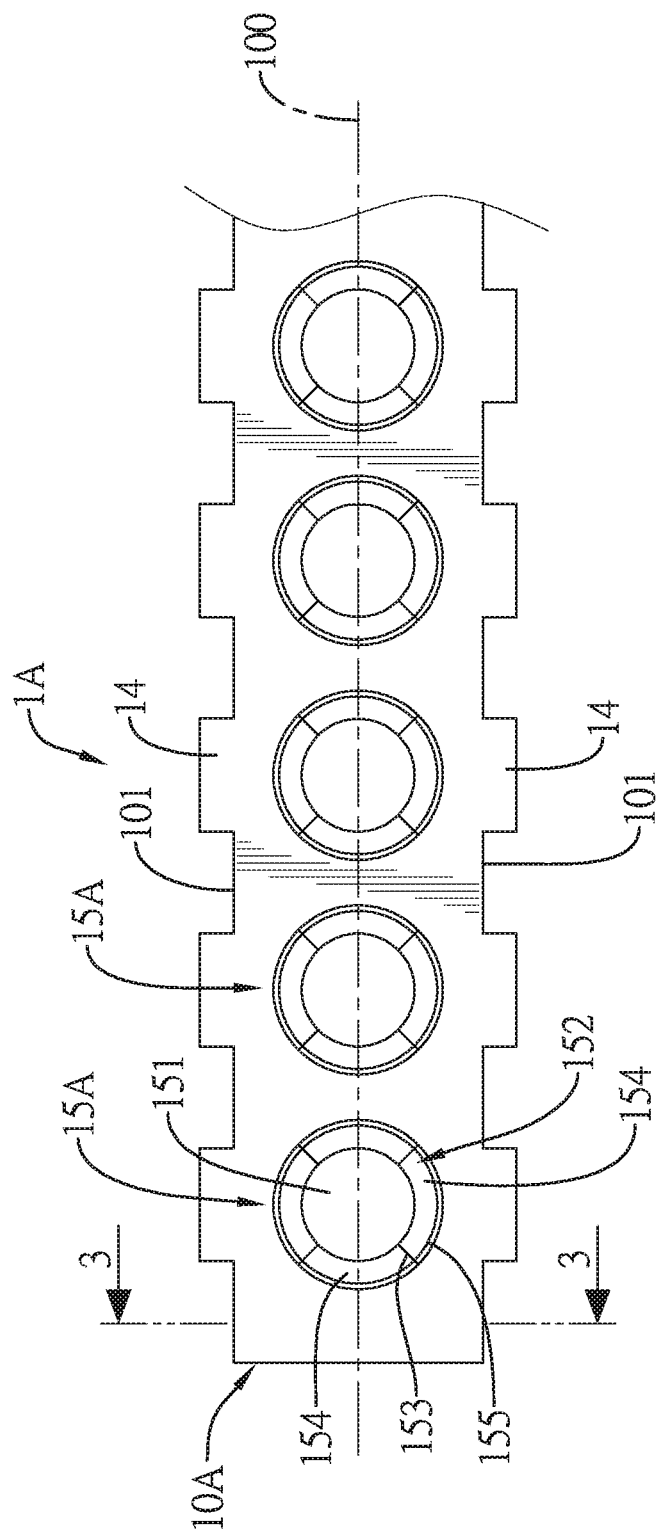
FIG. 2 is a top side view of the screw band in FIG. 1.

With reference to FIGS. 1 and 2, in the first embodiment of the screw band 1A, the body 10A has a central line 100 defined in the body 10A. The positioning members 15A are disposed along the central line 100 of the body 10A at spaced intervals. Each one of the positioning members 15A has a through hole 151 and a circular positioning portion 152. The through hole 151 is formed through the body 10A. The circular positioning portion 152 is formed on the body 10A, is located around the through hole 151, and has multiple slashes 153 and multiple supporting plates 154. The slashes 153 are formed in the body 10A, are located around the through hole 151 with an equiangular configuration relative to a center of the through hole 151, and communicate with the through hole 151. The supporting plates 154 are bendable, are formed on the body 10A, and are located around the through hole 151. Each one of the supporting plates 154 is located between two adjacent said slashes 153. The sizes of the through hole 151 and the circular positioning portion 152 are according to the sizes of the screws and the washers.

With reference to FIGS. 1 and 2, in the first embodiment of the screw band 1A, the body 10A has a top surface, a bottom surface, and multiple circular impressions 155. The bottom surface of the body 10A is opposite to the top surface of the body 10A. The circular impressions 155 are selectively disposed on the top surface and/or the bottom surface of the body 10A, and are located around the positioning members 14. The thickness of the body 10A at each one of the circular impressions 155 is decreased. The slashes 153 extend to a corresponding one of the circular impressions 155. The supporting plates 154 can be bent along the adjacent circular impression 155.

With reference to FIGS. 1 and 2, in the first embodiment of the screw band 1A, the body 10A has two side walls 101 and multiple protruding portions 14. The two side walls 101 are formed on the body 10A. The protruding portions 14 are formed on and protrude from the two side walls 101 of the body 10A respectively adjacent to the positioning members 15A.

In use, the screw band 1A can hold multiple screws 20 or multiple screw assemblies 2. With reference to FIGS. 5 to 8, in the first embodiment of the screw band 1A, each one of the positioning members 15A holds a screw assembly 2. The screw assembly 2 has a screw 20 and a washer 21 disposed around the screw 20. The washer 21 is located at the through hole 151 of a corresponding one of the positioning members 15A. The supporting plates 154 of the corresponding one of the positioning members 15A are inserted into a groove 211 formed around an outer surface of the washer 21 for clipping the washer 21. The screw band 1A holds multiple screw assemblies 2 to form a screw band set.

For antirust or appearance purposes, the screws 20 are coated and baked. The body 10A has the two paper layers 11. The waterproof heat-insulation films 112 of the two paper layers 11 are respectively located at the two outer surfaces of the body 10A. The screw band 1A has waterproof and heat-insulation effects due to the waterproof heat-insulation films 112. After the screw assemblies 2 are disposed on the screw band 1A, the screw assemblies 2 can be applied with coating and baking processes automatically with the screw band 1A. Furthermore, the protruding portions 14 located at the two side walls 101 of the body 10A allow the screw band 1A to be positioned and carried during the coating and the baking processes. The screws 20 can be coated and baked by an automatic means. An antirust layer or a colored coating layer is formed on an outer surface of each one of the screws 20.

Figure 8:
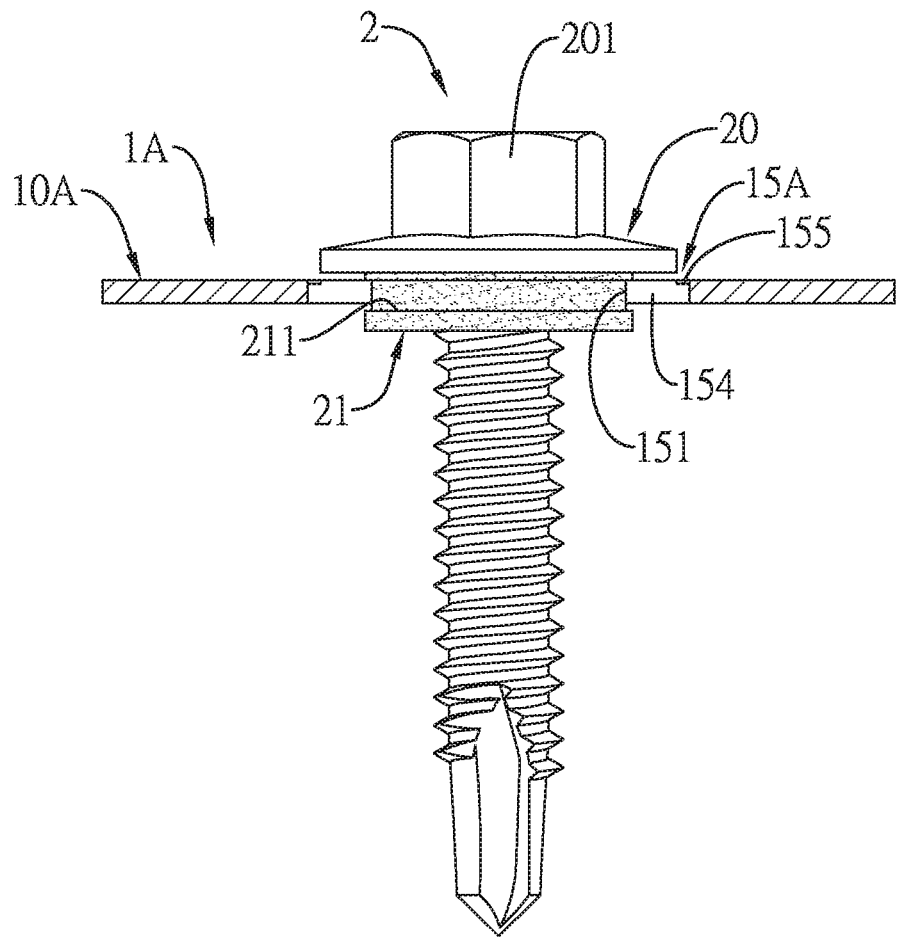
FIG. 8 is an operational side view in partial section of the screw band along line 8-8 in FIG. 7.
Figure 9:
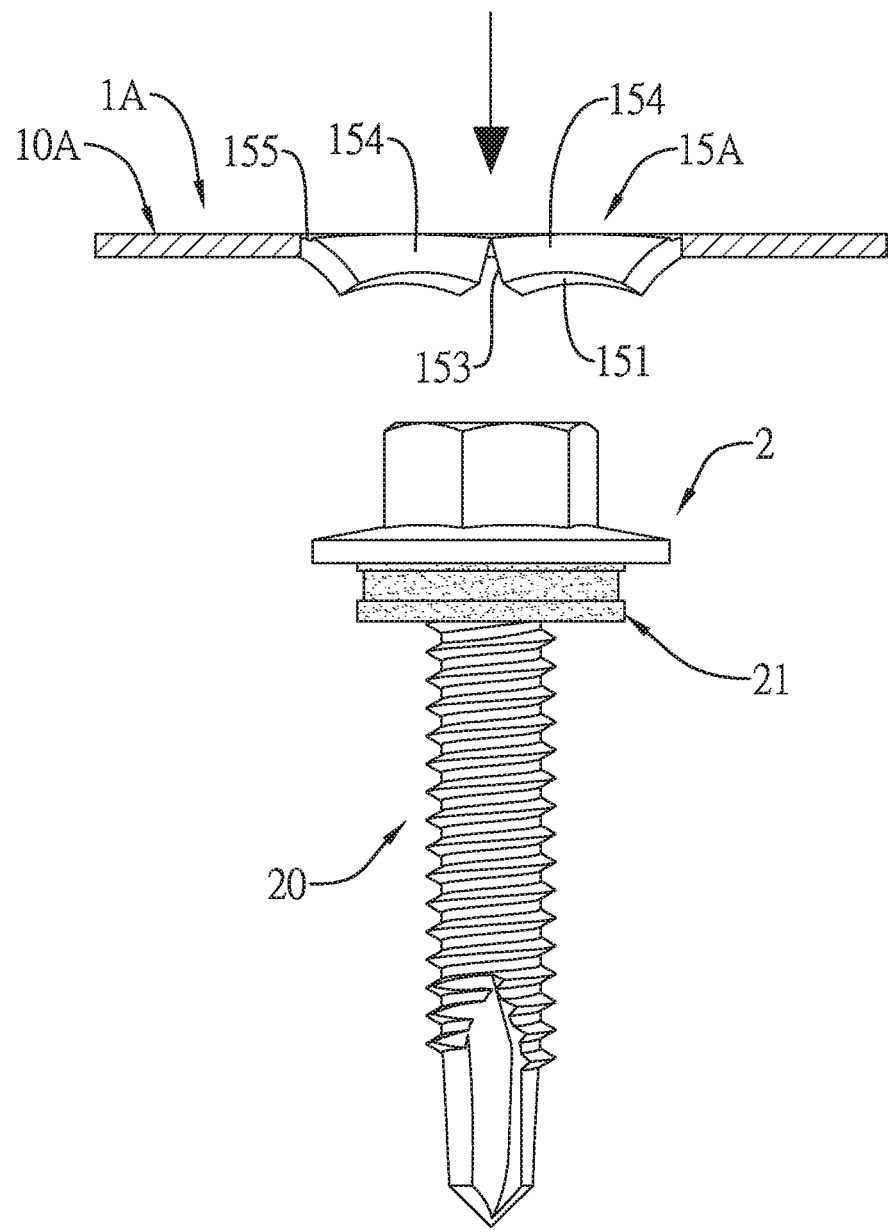
FIG. 9 is another operational side view in partial section of the screw band in FIG. 7 showing that a screw with a washer is pressed downwardly and is detached from the screw band.

The screw assemblies 2 disposed on the screw band 1A can be used conveniently in a screwing process. With reference to FIGS. 8 and 9, a user can press a head 201 of the screw 20. The washer 21 presses the supporting plates 154 of the corresponding positioning member 15A. The supporting plates 154 are bent downwardly for increasing the slashes 153 and a diameter of the through hole 515, so that the screw assembly 2 can pass through the corresponding positioning member 15A and is detached from the screw band 1A.

Figure 10:
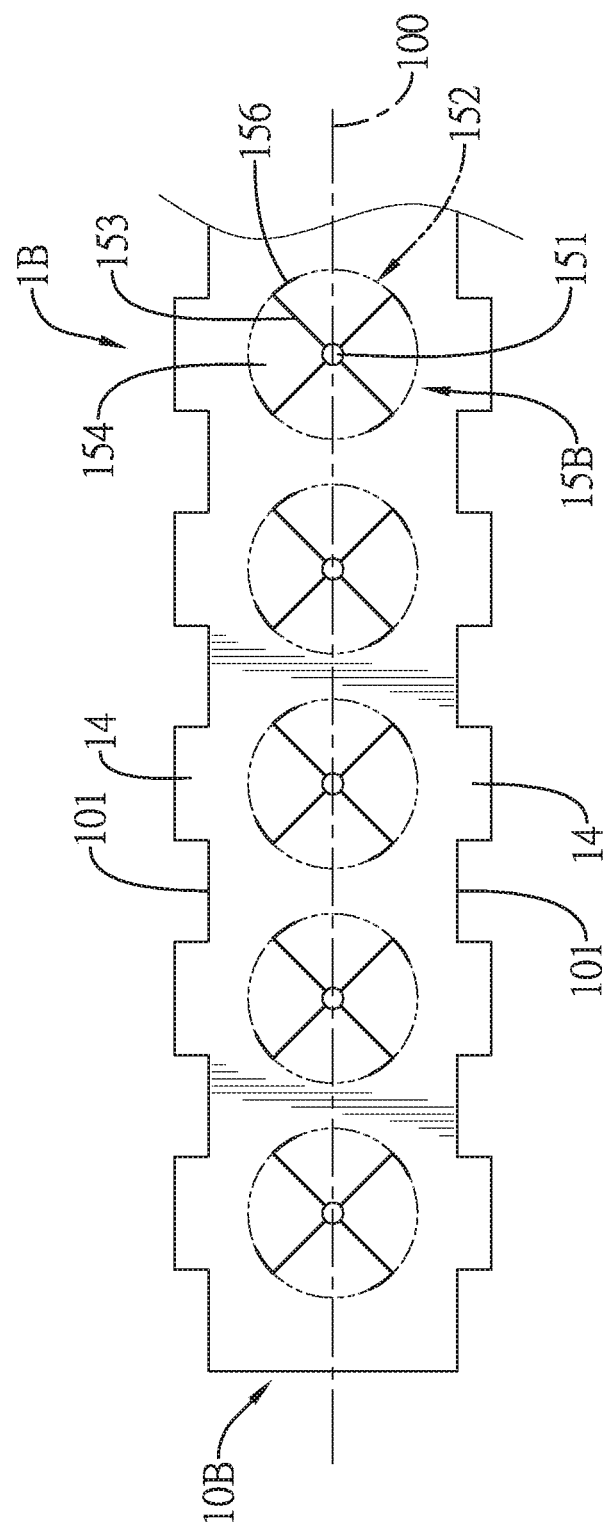
FIG. 10 is a top side view of a second embodiment of a screw band in accordance with the present invention.
Figure 11:
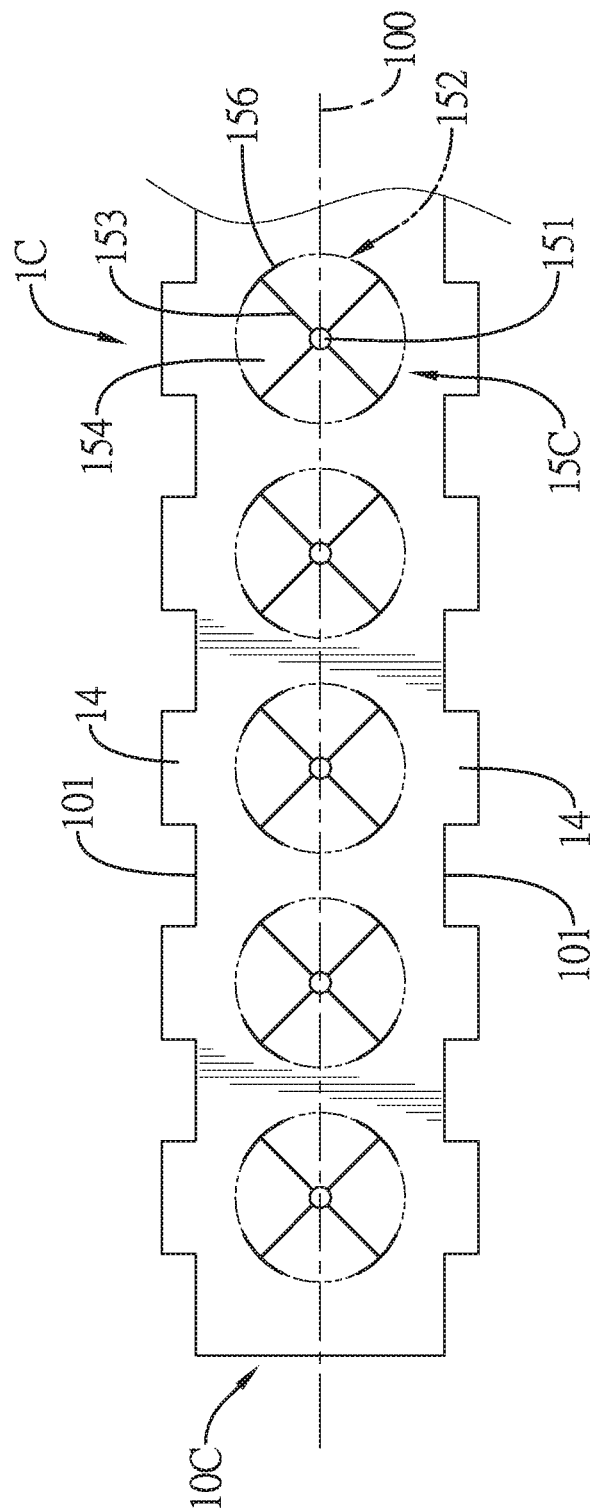
FIG. 11 is a top side view of a third embodiment of a screw band in accordance with the present invention.

With reference to FIGS. 10 and 11, the structures of the bodies 10B, 10C in a second embodiment and a third embodiment of the screw band 1B, 1C are same as the structure of the body 10A in the first embodiment of the screw band 1A. The positioning members 15B, 15C are disposed on the central line 100 of the body 10B, 10C at spaced intervals. Each one of the positioning members 15B, 15C has the through hole 151 and the circular positioning portion 152. The through hole 151 is formed through the body 10B, 10C. The circular positioning portion 152 is formed on the body 10B, 10C, is located around the through hole 151, and has the slashes 153 and the supporting plates 154. The slashes 153 are formed in the body 10B, 10C, are located around the through hole 151 with the equiangular configuration relative to the center of the through hole 151, and communicate with the through hole 151. The supporting plates 154 are bendable, are formed on the body 10B, 10C, and are located around the through hole 151. Each one of the supporting plates 154 is located between the two adjacent said slashes 153. The protruding portions 14 are formed on and protrude out of the two side walls 101 of the body 10B, 10C adjacent to the positioning members 15B, 15C. The sizes of the through hole 151 and the circular positioning portion 152 are according to the sizes of the screws 20.

With reference to FIGS. 10 and 11, in a second embodiment and a third embodiment of the screw band 1B, 1C, each one of the slashes 153 has an inner end, an outer end, and a slash side portion 156. The inner end of the slash 153 is adjacent to a corresponding one of the through holes 151. The outer end of the slash 153 is opposite to the inner end of the slash 153. The slash side portion 156 is formed on the body 10B, 10C, is connected to the outer end of the slash 153, and extends toward one side or two sides of the slash 153. The supporting plates 154 can be bent along the slashes 153 and the slash side portions 156.

Figure 12:
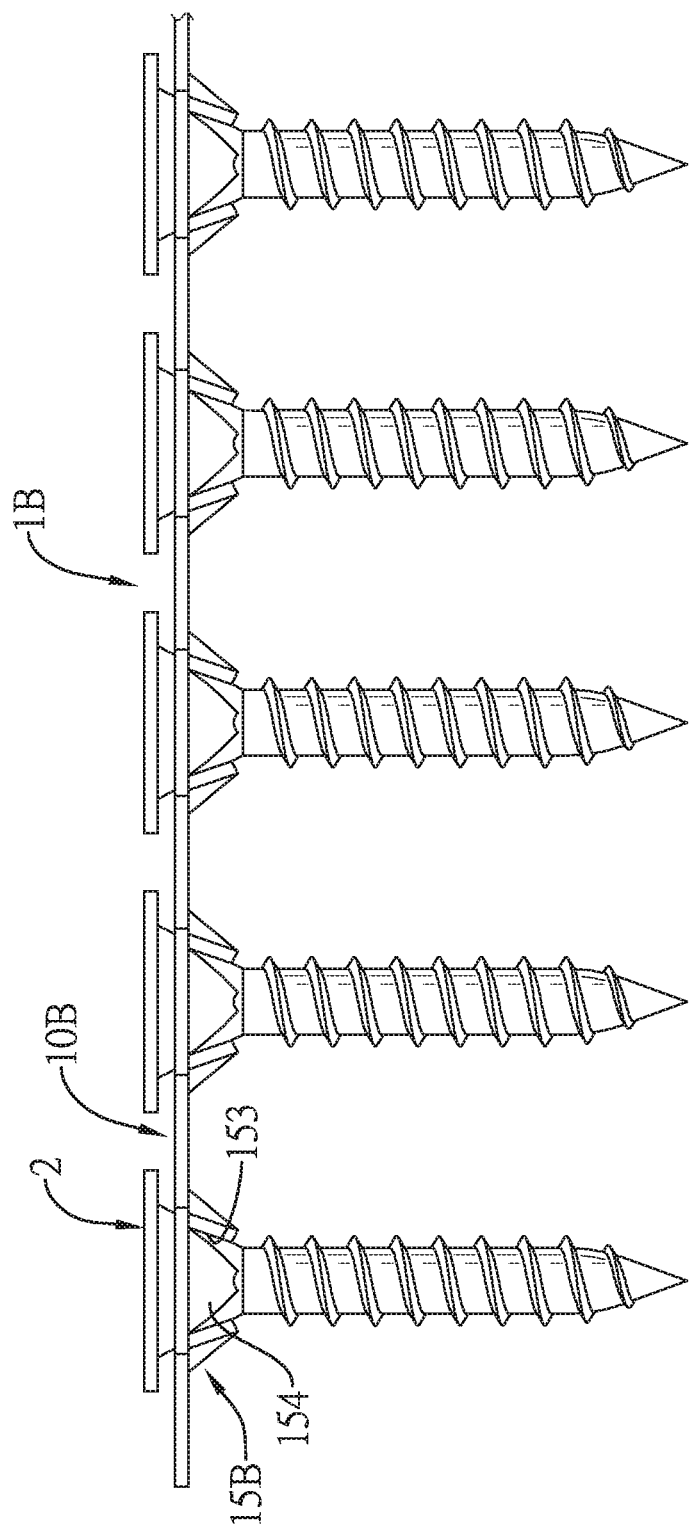
FIG. 12 is an operational side view of the screw band in FIG. 10.

The use of the second embodiment and the third embodiment of the screw band 1B, 1C are same as that of the first embodiment of the screw band 1A. The second embodiment and the third embodiment of the screw band 1B, 1C are adapted to clip the screws 20 or the screw assemblies 2. With reference to FIG. 12, the second embodiment of the screw band 1B is adapted to clip the screws 20 or the screw assemblies 2. Each one of the positioning members 15B holds the screw 20. The supporting plates 154 of the corresponding one of the positioning members 15B co-clip the screw 20. The screw band 1B holds the screws 20 to form the screw band set.

Figure 13:
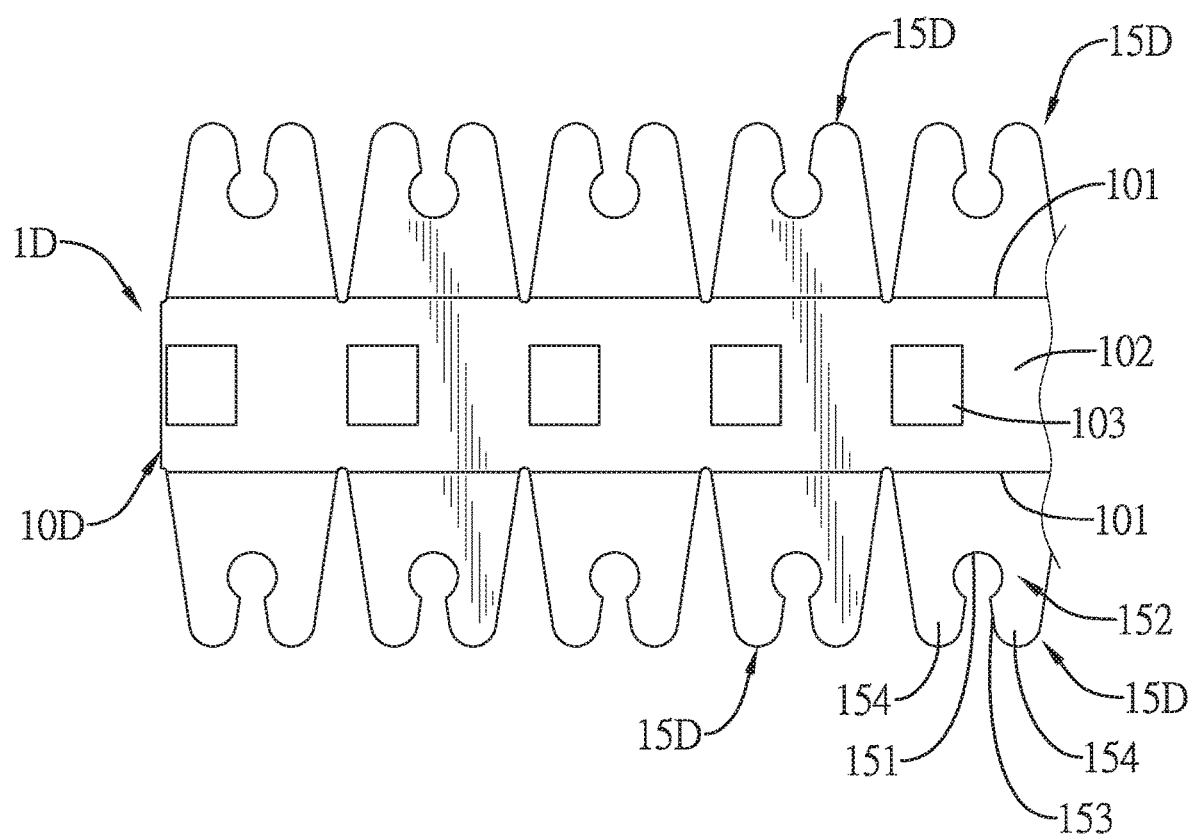
FIG. 13 is a top side view of a fourth embodiment of a screw band in accordance with the present invention.

With reference to FIG. 13, in the fourth embodiment of the screw band 1D, the body 10D has a middle portion 102 having the two side walls 101 and multiple alignment holes 103. The alignment holes 103 are formed through the middle portion 102 at spaced intervals. The positioning members 15D are symmetrically located at the two side walls 101 of the middle portion 102. Each one of the positioning members 15 has the through hole 151, the positioning portion 152, the slash 153, and the two supporting plates 154. The through hole 151 is formed through the body 10D. The positioning portion 152 is disposed around the through hole 151. The slash 153 is formed through the body 10D and communicates with the through hole 151. The two supporting plates 154 are bendably formed on the body 10D and are located beside two sides of the slash 153.

Figure 14:
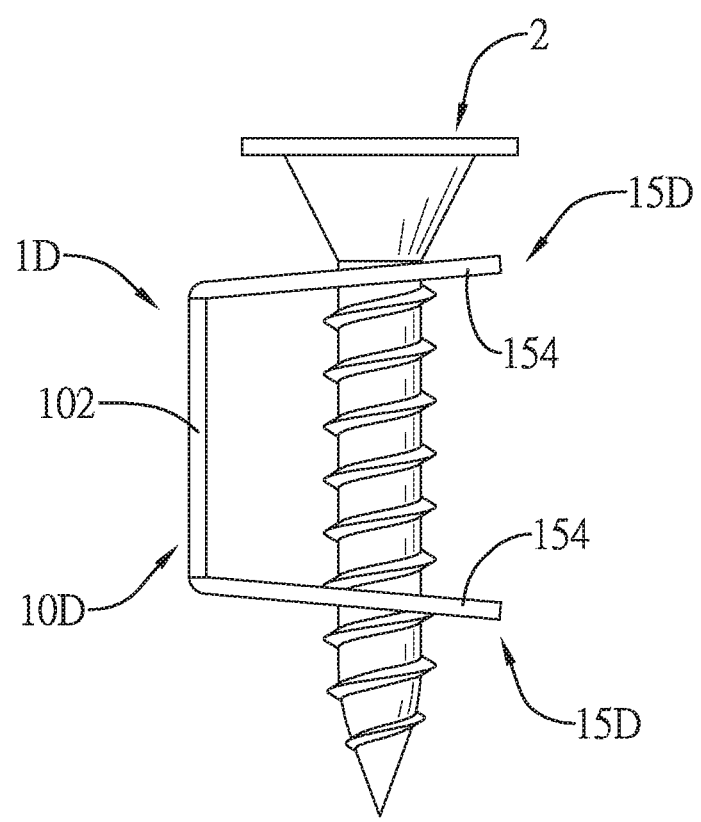
FIG. 14 is an operational side view of the screw band in FIG. 13.

With reference to FIGS. 13 and 14, the fourth embodiment of the screw band 1D is adapted to clip the screws 20. The positioning members 15D located at the two side walls 101 of the body 10D are bent toward the same side of the middle portion 102 and are arranged vertically opposite. The two positioning members 15D arranged vertically opposite are used to clip one screw 20. The supporting plates 154 are bendable. The screw band 1D holds the screws 20 to form the screw band set.

What is claimed is:

1. A screw band comprising:
    a body having
        two outer surfaces, and
        two paper layers disposed at a spaced interval, each one of the two paper layers having
            a paper base having an outer surface and an inner surface, and
            a waterproof heat-insulation film mounted on and covering the outer surface of the paper base;
    at least one adhesive layer disposed between and connected with the two paper layers, wherein the at least one adhesive layer is connected to the inner surfaces of the paper bases of the two paper layers, and the waterproof heat-insulation films of the two paper layers are respectively located at the two outer surfaces of the body; and
    multiple positioning members disposed on the body at spaced intervals.

2. The screw band as claimed in claim 1, wherein
    the at least one adhesive layer includes multiple adhesive layers,
    the body has at least one reinforcing layer, which is disposed between the two paper layers and is adhered to the two paper layers by the multiple adhesive layers, and
    a material of each one of the at least one reinforcing layer is the same as a material of the paper base of each one of the two paper layers.

3. The screw band as claimed in claim 1, wherein
    the body has a central line defined in the body; and
    the positioning members are disposed along the central line of the body at spaced intervals, and each one of the positioning members has
        a through hole formed through the body; and
        a circular positioning portion formed on the body, located around the through hole, and having
            multiple slashes formed in the body, located around the through hole, and communicating with the through hole; and
            multiple supporting plates being bendable, formed on the body, and located around the through hole, wherein each one of the supporting plates is located between two adjacent said slashes.

4. The screw band as claimed in claim 2, wherein
    the body has a central line defined in the body; and
    the positioning members are disposed along the central line of the body at spaced intervals, and each one of the positioning members has a through hole formed through the body; and
a circular positioning portion formed on the body, located around the through hole, and having
multiple slashes formed in the body, located around the through hole, and communicating with the through hole; and
multiple supporting plates being bendable, formed on the body, and located around the through hole, wherein each one of the supporting plates is located between two adjacent said slashes.

5. The screw band as claimed in claim 3, wherein the body has
a top surface;
a bottom surface opposite to the top surface of the body;
two side walls formed on the body;
multiple protruding portions formed on and protruding out of the two side walls of the body adjacent to the positioning members; and
multiple circular impressions selectively disposed on the top surface and/or the bottom surface of the body, and located around the positioning members.

6. The screw band as claimed in claim 4, wherein the body has
a top surface;
a bottom surface opposite to the top surface of the body;
two side walls formed on the body;
multiple protruding portions formed on and protruding out of the two side walls of the body adjacent to the positioning members; and
multiple circular impressions selectively disposed on the top surface and/or the bottom surface of the body, and located around the positioning members.

7. The screw band as claimed in claim 3, wherein the body has
two side walls formed on the body; and
multiple protruding portions formed on and protruding out of the two side walls of the body adjacent to the positioning members; and
each one of the slashes has
an inner end adjacent to the through hole;
an outer end opposite to the inner end of the slash; and
a slash side portion formed on the body, connected to the outer end of the slash, and extending toward one side or two sides of the slash.

8. The screw band as claimed in claim 4, wherein the body has
two side walls formed on the body; and
multiple protruding portions formed on and protruding out of the two side walls of the body adjacent to the positioning members; and
each one of the slashes has
an inner end adjacent to the through hole;
an outer end opposite to the inner end of the slash; and
a slash side portion formed on the body, connected to the outer end of the slash, and extending toward one side or two sides of the slash.

9. The screw band as claimed in claim 1, wherein
the body has a middle portion having two side walls; and
the positioning members are symmetrically located at the two side walls of the middle portion, and each one of the positioning members having
a through hole formed through the body;
a slash formed through the body and communicating with the through hole; and
two supporting plates bendably formed on the body and located beside two sides of the slash.

10. The screw band as claimed in claim 2, wherein
the body has a middle portion having two side walls; and
the positioning members are symmetrically located at the two side walls of the middle portion, and each one of the positioning members having
a through hole formed through the body;
a slash formed through the body and communicating with the through hole; and
two supporting plates bendably formed on the body and located beside two sides of the slash.

11. The screw band as claimed in claim 9, wherein the body has multiple alignment holes formed through the middle portion at spaced intervals.

12. The screw band as claimed in claim 10, wherein the body has multiple alignment holes formed through the middle portion at spaced intervals.

* * * * *